United States Patent [19]

Christoph

[11] 4,176,565

[45] Dec. 4, 1979

[54] SPHERICAL BEARING SEAT CUTTER MACHINE

[75] Inventor: Dieter Christoph, Streamwood, Ill.

[73] Assignee: Siegfried Schulz, Rolling Meadows, Ill. ; a part interest

[21] Appl. No.: 939,323

[22] Filed: Sep. 5, 1978

[51] Int. Cl.² ............... B23B 3/28; B23B 41/00; B23B 3/22

[52] U.S. Cl. .................................. 82/12; 82/1.2; 82/4 C

[58] Field of Search ............... 82/1.2, 1.4, 1.5, 12, 82/4 C, 4 R

[56] References Cited

U.S. PATENT DOCUMENTS

| | | | |
|---|---|---|---|
| 126,522 | 5/1872 | Cooper | 82/12 |
| 508,640 | 11/1893 | Riddell | 82/12 |
| 1,684,667 | 9/1928 | Frenette | 82/12 |
| 2,134,210 | 10/1938 | Secor | 82/12 |
| 2,409,578 | 10/1946 | McDonald | 82/1.2 |
| 3,418,884 | 12/1968 | Baumgartner | 82/1.2 |

*Primary Examiner*—Harrison L. Hinson

[57] ABSTRACT

The present invention relates to a spherical bearing seat cutter machine for cutting large spherical bearing seats, such as, those used in equipment which is installed in power-generating stations and other like plants. The apparatus includes a pair of spaced supports, each of which is adapted to be connected to a workpiece. A drive shaft is rotatably mounted in the supports. A rotary drive is connected to the drive shaft for rotating the drive shaft in the supports. A cutter assembly is mounted on the drive shaft, which cutter assembly includes a cutting tool which travels on an arcuate track for cutting a spherical bearing seat. The cutter assembly includes a counterweight opposite the cutting tool. An arcuate drive is connected to the cutting tool for moving the cutting tool along the arcuate track as the drive shaft rotates. The machine also includes an axial drive for moving the cutter assembly axially along the drive shaft for making a straight or cylindrical cut.

18 Claims, 7 Drawing Figures

SPHERICAL BEARING SEAT CUTTER MACHINE

BACKGROUND OF THE INVENTION

Power-generating stations normally contain large pieces of equipment. The equipment is used constantly when the station is in operation. When the station is shut down for repairs, not only are repairs made; but preventive maintenance is also performed on much of the equipment. Some of the equipment is supported on spherical bearings. Those spherical bearings are mounted in spherical bearing seats which, in some instances, must be refinished during repair or maintenance of the equipment, that is, the bearing seat must be recut into a true sphere. In view of the fact that much of the equipment is substantial in size, it is desirable that the equipment be left in place and machine tools be brought to the equipment to do the work. Certain advantages flow from bringing the machine tools to the equipment rather than moving the equipment to a machine shop. It is not necessary to disassemble other connected equipment in order to do the required machining; and, in the case of large pieces of equipment, it is impractical to move the equipment.

Heretofore, there has been no suitable equipment available for machining spherical bearing seats in place.

SUMMARY OF THE INVENTION

The present invention provides a portable machine which is readily mounted on a workpiece for cutting a spherical bearing seat in the workpiece. The machine generally consists of a pair of supports, which are particularly adapted to be mounted on a workpiece, and in particular flanges of a workpiece. The supports have a drive shaft rotatably mounted therein. The drive shaft is rotatably driven by a rotary drive, which includes a fluid motor. A cutter assembly is mounted on the drive shaft. The cutter assembly includes a cutter bearing, with an arcuate track connected to the cutter bearing. A way follower is slideably mounted on the arcuate track, and a cutting tool is connected to the way follower. The cutting tool cuts the bearing seat in the workpiece. An arcuate drive is connected to the way follower to move the cutting tool on the arcuate track as the rotary drive rotates the drive shaft to effect a spherical cut. The cutter bearing is also connected to an axial drive for moving the cutter assembly along the drive shaft when required.

DESCRIPTION OF THE PREFERRED EMBODIMENT

Figure 1:
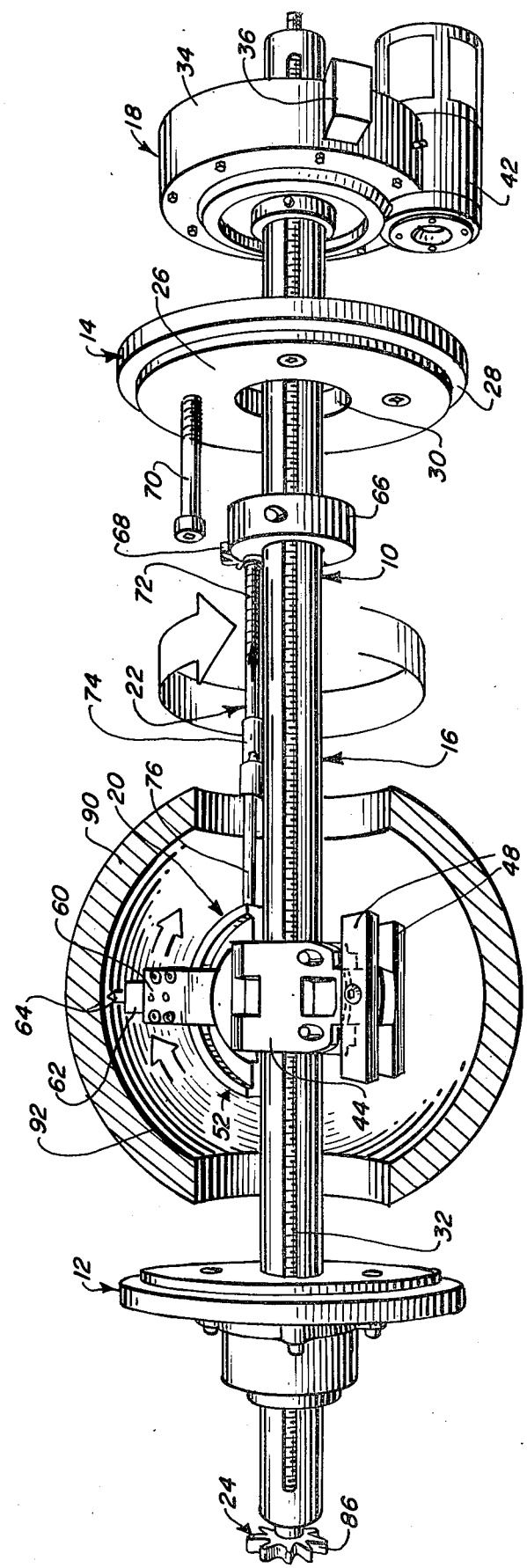
FIG. 1 is a perspective view of a spherical bearing seat cutter machine embodying the present invention, shown with a portion of a workpiece having a spherical bearing seat, with a cutting tool in an attitude for cutting the spherical bearing seat.
Figure 3:
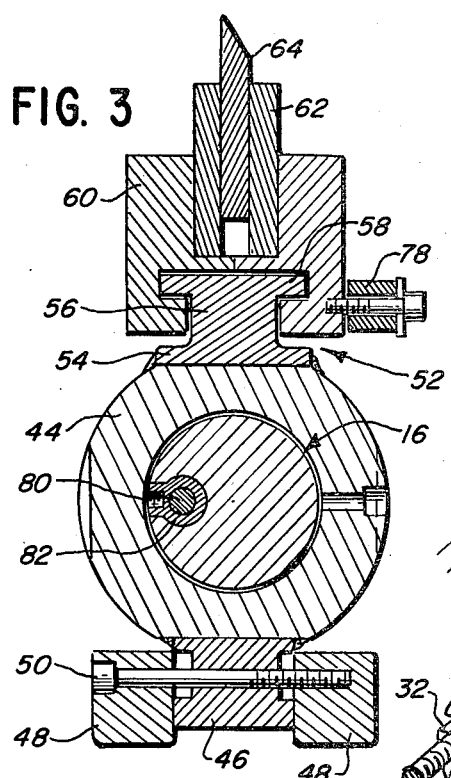
FIG. 3 is a cross-sectional view taken on Line 3—3 of FIG. 2, showing in greater detail the interrelation of the parts of the cutter assembly and the drive shaft.
Figure 2:
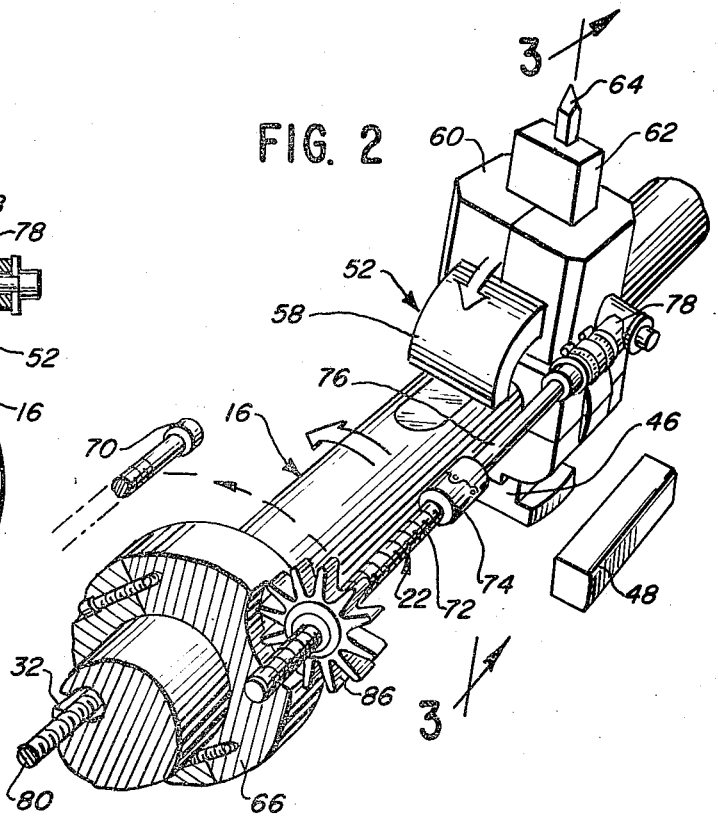
FIG. 2 is a perspective view of a portion of the spherical bearing cutter machine of FIG. 1, showing a portion of a drive shaft, a cutter assembly on the drive shaft, and an arcuate drive mounted on the drive shaft and connected to the cutter assembly.

Referring now to the drawings, and especially to FIG. 1, a spherical bearing seat cutter machine embodying the present invention is shown therein and is generally indicated by numeral 10. The machine 10 generally consists of a pair of spaced supports 12 and 14, which have a drive shaft 16 rotatably mounted in the supports. Drive shaft 16 is drivingly connected to a rotary drive 18, which is mounted on one end of the drive shaft. A cutter assembly 20 is mounted on the drive shaft between the supports and is drivingly connected to an arcuate drive 22. An axial drive 24 is mounted on the drive shaft and is connected to the cutter assembly 20 to move the cutter assembly along the drive shaft as required for proper cutting of a workpiece.

Supports 12 and 14 are identical in construction. Each of the supports has a circular plate 26, with a flange 28 formed on the outer periphery of plate 26 for mounting the support on a flange of a workpiece. Inasmuch as the machine is designed for use in power-generating stations, the adaptation of the supports for mounting on a flange is eminently practical since many flange joints are normally used in a power-generating station. A bearing 30 is mounted in the center of each of the plates 26 for rotatably supporting drive shaft 16 and allowing the drive shaft to have free rotation in the supports.

Drive shaft 16 is an elongated solid shaft, having a circular cross-section, with a lead screw groove 32 formed along a substantial portion of the length of the drive shaft parallel to the axis of the drive shaft. Groove 32 does not extend to the ends of the drive shaft; but, rather, a lead screw support aperture 33 extends from each end of the drive shaft into each end of groove 32. The outer surface of the drive shaft is chromium-plated to increase its life and to facilitate movement of the cutter assembly along the drive shaft.

Figure 7:
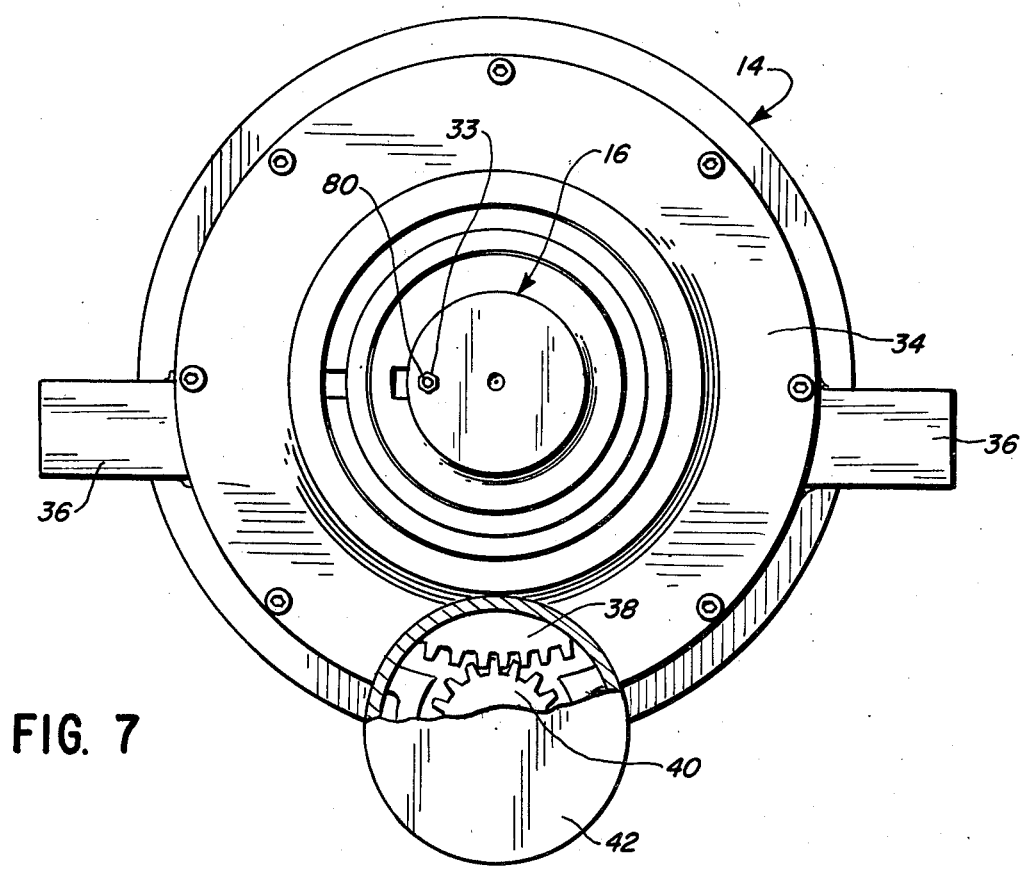
FIG. 7 is an enlarged end view of the opposite end of the machine of FIG. 1, showing a rotary drive mounted on the drive shaft, with a portion of a housing of the rotary drive broken away to show meshing of a pinion with a gear of the rotary drive.

Rotary drive 18 is connected to one end of the drive shaft, as may be seen in FIGS. 1 and 7. The rotary drive includes a housing 34, which has a pair of stops 36 formed therein for connection to a portion of a workpiece (not shown) to prevent rotation of the housing. A gear 38 is rotatably mounted in the housing, and the gear is secured to the drive shaft for rotation with the drive shaft. A pinion 40 is rotatably mounted in the housing 34 and meshes with gear 38. The pinion is drivingly connected to a conventional fluid motor 42, which is connected to a suitable source of fluid under pressure to provide energy to the fluid motor to drive pinion 40. It may be appreciated that, irrespective of the position of the machine, the fluid motor may be provided with a source of energy simply by bringing conventional fluid lines to the motor, which lines are connected to a suitable source of fluid under pressure.

The cutter assembly includes a split cutter bearing 44, which is slideably mounted on the chromium-plated surface of drive shaft 16. The axial drive is connected to the cutter bearing to move the cutter bearing along the drive shaft and to prevent the cutter bearing from rotating on the drive shaft, so that the cutter bearing rotates with the drive shaft. The cutter bearing includes a counterweight mount 46. A pair of counterweights 48 is secured to the counterweight mount by a counterweight fastener 50.

An arcuate track 52 is fixed to the cutter bearing 44 opposite the counterweight mount. The arcuate track generally includes a base 54, with a center section 56 formed integral therewith and an arcuate way 58 formed integral with the center section. The arcuate way has its outer surface defining a portion of a circle for reasons which will become apparent hereinafter. The cutter assembly also includes a split way follower 60, which is slideably mounted on the arcuate track. The way follower has a conventional tool holder 62 secured therein, with a conventional cutting tool 64 mounted in the tool holder. The way follower cooperates with the arcuate track to provide means for determining movement of the cutting tool relative to the drive shaft in an arcuate path.

The cutter assembly is connected to arcuate drive 22. The arcuate drive includes a drive collar 66, which is mounted on the drive shaft. A star wheel 68 is rotatably mounted on the drive collar. The star wheel is intermittently engageable with a star wheel drive rod 70, which rod is mounted on support 14. A lead screw 72 is threadedly mounted in star wheel 68 and is movable through the star wheel as the star wheel rotates. The lead screw has a universal joint 74 connected to one end. A connector rod 76 has one end connected to the universal joint 74. The other end of the connector rod 76 is connected to a pivot joint 78, which is mounted on way follower 60.

Figure 5:
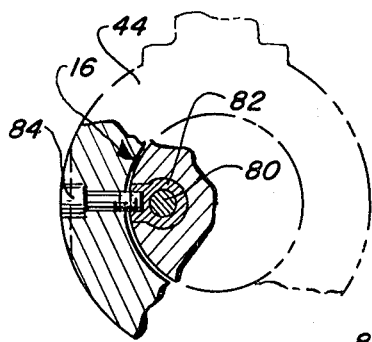
FIG. 5 is an enlarged fragmentary cross-sectional view, showing a fastener connecting a cutter bearing of the cutter assembly to a nut, which nut is in turn connected to a lead screw.

Axial drive 24 includes an axial drive lead screw 80, which is rotatably mounted in groove 32 and lead screw support aperture 33 of drive shaft 16. As may be best seen in FIG. 5, lead screw 80 has a nut 82 threadedly mounted thereon. Nut 82 is connected to cutter bearing 44 by a nut fastener 84 so that cutter bearing 44 moves axially along drive shaft 16 as lead screw 80 is rotated. However, nut 82 prevents the cutter bearing from rotating relative to the drive shaft, so that the cutter assembly and the arcuate drive rotates with the drive shaft. Lead screw 80 has an axial drive star wheel 86 secured to one end thereof. Star wheel 86 is intermittently engageable with an axial drive star wheel rod 88, which rod is mounted on support 12. The intermittent engagement of star wheel 86 with rod 88 during rotation of the drive shaft causes star wheel 86 to be rotated a given increment. The instant machine is adapted for use in the field, that is, it may be used at a power-generating station. The machine is versatile in that not only may it cut a spherical bearing seat; but it also may be used to make a straight cut, as may be required at the end of a spherical bearing seat.

Machine 10 is mounted in a workpiece 90 by securing supports 12 and 14 to end flanges of a workpiece, which end flanges of the workpiece are not shown herein. A spherical bearing seat is shown in FIG. 1 and is generally indicated by numeral 92. Once the machine has been secured and cutting tool 64 has been adjusted to the proper size, the cutting tool is placed at one end of the arcuate track. The machine is in an attitude to be activated.

Fluid under pressure is provided to fluid motor 42, which rotates pinion 40. Pinion 40 drives gear 38. Rotation of gear 38, in turn, rotates drive shaft 16. It may be appreciated that, as the drive shaft 16 rotates, it carries with it the cutter assembly. Cutting tool 64 cuts into the bearing seat to remove metal, as is conventional. With each revolution of the drive shaft, star wheel 68 engages rod 70 so that the star wheel is incrementally rotated. Each time star wheel 68 is incrementally rotated, lead screw 72 is moved through star wheel 68. As lead screw 72 moves through the star wheel, the way follower 60 is moved along arcuate way 58 to follow the curvature of the arcuate way. It may be appreciated that, as the cutting tool makes a complete revolution by virtue of the rotation of the drive shaft, the cutting tool is incrementally moved by the rotation of star wheel 68 so that the cutting tool then follows a geometrically similar path to that of arcuate way 58. Accordingly, the spherical bearing seat cut by the cutting tool is geometrically similar to the outer surface of arcuate way 58.

When the cutting tool is cutting into the workpiece while the drive shaft is rotating, counterweights 48 on the opposite end of the cutter bearing provide a balancing force to the cutting tool so that vibration of the cutting tool is greatly reduced to eliminate tool chatter. A spherical bearing seat may be readily and conveniently cut by the present machine.

Figure 4:
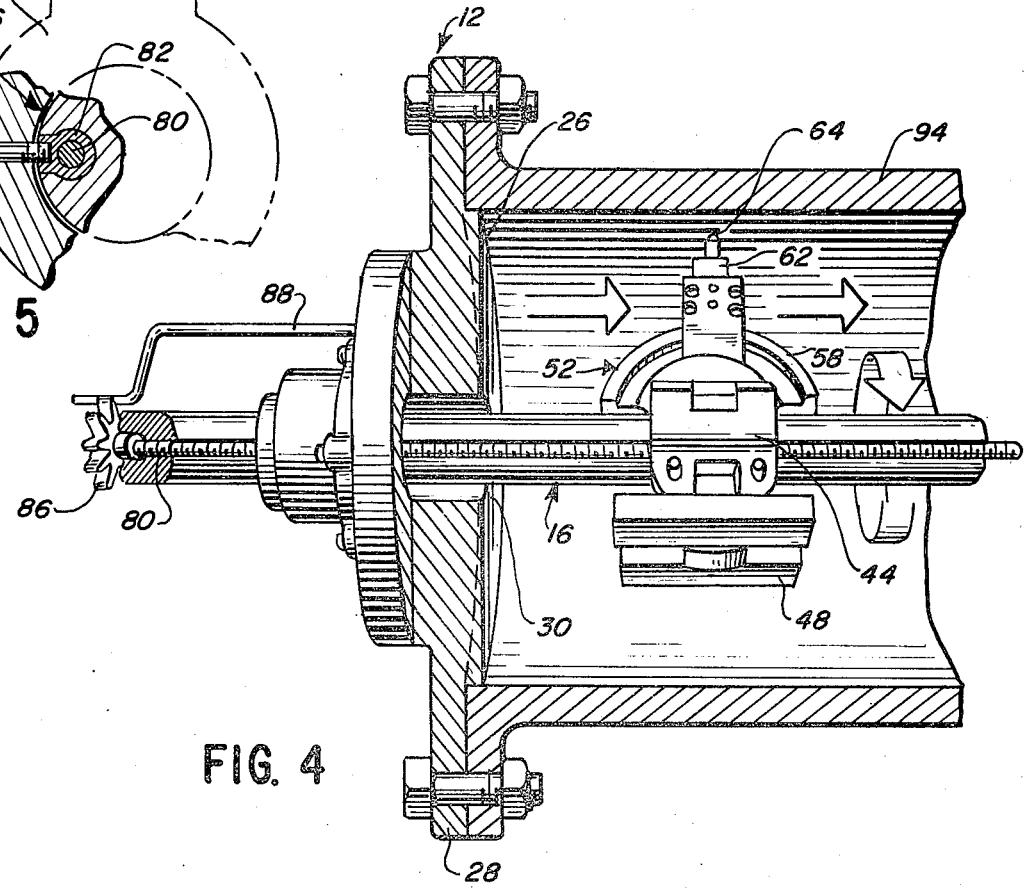
FIG. 4 is an enlarged perspective view, showing the machine of FIG. 1 mounted on a workpiece in an attitude for making a straight cut.
Figure 6:
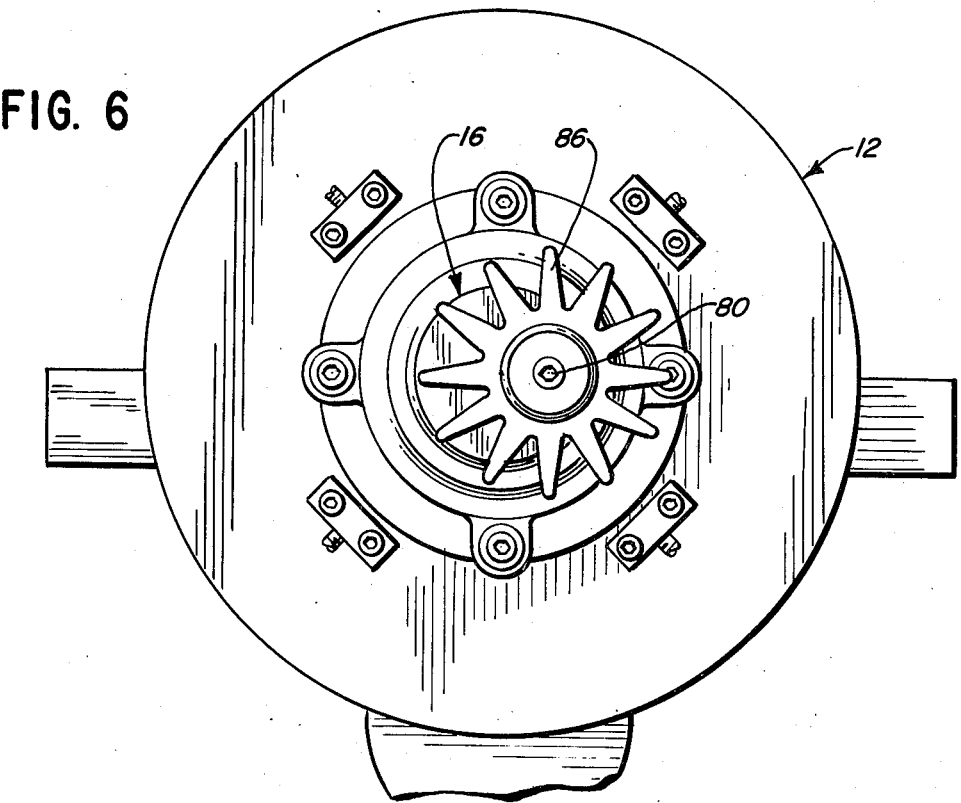
FIG. 6 is an enlarged end view of one end of the machine of FIG. 1.

As was mentioned above, the present machine may also be used to make a straight cut in a workpiece, when needed. FIG. 4 shows the machine mounted on a workpiece 94, adapted to make a straight cut. The straight cut is accomplished simply by removing rod 70 and adding rod 88 to the support 12 so that, with each turn of the drive shaft, star wheel 86 engages rod 88 to create an incremental movement of the cutter tool along the drive shaft. As star wheel 86 is incrementally rotated, lead screw 80 is incrementally rotated also. Nut 82 is moved incrementally along lead screw 80 to move incrementally the cutter bearing axially along the drive shaft. Since rod 70 is removed, star wheel 68 is not rotated; and the cutting tool is held in a set position relative to the drive shaft. As the drive shaft rotates and the cutting tool moves parallel to the axis of the drive shaft, the cutting tool makes a cylindrical or straight cut in the workpiece. However, it should be noted that, in certain instances, it may be desirable to have the axial drive and the arcuate drive operate simultaneously.

Although a specific embodiment of the herein-disclosed invention has been described in detail above and shown in detail in the accompanying drawings, it is to be expressly understood that the instant invention is limited only by the appended claims.

What is claimed is:

1. A portable spherical bearing seat cutter machine for cutting a spherical bearing seat comprising: a pair of spaced supports adapted for being connected to a workpiece having a spherical bearing seat for supporting the cutter machine on the workpiece; a drive shaft rotatably mounted in the spaced supports; a rotary drive connected to the drive shaft for rotating the drive shaft in the spaced supports; a cutter assembly mounted on the drive shaft rotatable with the drive shaft, said cutter assembly including a cutting tool rotatable with the drive shaft for cutting the spherical bearing seat in the workpiece, and means for determining movement of the cutting tool relative to the drive shaft in an arcuate path; and an arcuate drive connected to the cutting tool for moving the cutting tool relative to the drive shaft in the arcuate path while the drive shaft is rotating.

2. A portable spherical bearing seat cutter machine for cutting a spherical bearing seat as defined in claim 1, wherein the cutter assembly includes; a cutter bearing mounted on the drive shaft, and said means includes; an arcuate track mounted on the cutter bearing having a curvature geometrically similar to the curvature of the bearing seat to be cut, and a way follower movably mounted on the arcuate track supporting the cutting tool.

3. A portable spherical bearing seat cutter machine for cutting a spherical bearing seat as defined in claim 2, wherein the cutter assembly includes a counterweight mounted on the cutter bearing opposite the cutting tool.

4. A portable spherical bearing seat cutter machine for cutting a spherical bearing seat as defined in claim 1, including an axial drive connected to the cutter assembly for moving the cutter assembly axially along the drive shaft while the drive shaft is rotating.

5. A portable spherical bearing seat cutter machine for cutting a spherical bearing seat as defined in claim 4, wherein the drive shaft contains a lead screw groove, and the axial drive includes; a lead screw rotatably mounted in the lead screw groove, an axial drive nut threadedly mounted on the lead screw and connected to the cutter bearing, a star wheel drivingly connected to the lead screw for rotating the lead screw, and an axial drive rod mounted on one of the supports and intermittently engageable with the star wheel for rotating the star wheel with each revolution of the drive shaft.

6. A portable spherical bearing seat cutter machine for cutting a spherical bearing seat as defined in claim 1, wherein the rotary drive includes; a gear drivingly connected to the drive shaft, a pinion meshing with the gear, a housing enclosing the gear and supporting the pinion, a stop connected to the housing to prevent rotation of the housing, and a fluid motor connected to the pinion for rotating the pinion.

7. A portable spherical bearing seat cutter machine for cutting a spherical bearing seat as defined in claim 1, wherein the arcuate drive includes; a drive collar mounted on the drive shaft, a star wheel rotatably mounted on the drive collar, a drive rod mounted on one of the supports and intermittently engageable with the star wheel for rotating the star wheel an increment with each revolution of the drive shaft, a lead screw threadedly mounted in the star wheel connected to the cutter assembly for moving the cutting tool along the arcuate path as the lead screw moves relative to the star wheel.

8. A portable spherical bearing seat cutter machine for cutting a spherical bearing seat as defined in claim 1, wherein the arcuate drive includes; a drive collar mounted on the drive shaft, a star wheel rotatably mounted on the drive collar, a drive rod mounted on one of the supports and engageable with the star wheel for rotating the star wheel an increment with each revolution of the drive shaft, a lead screw threadedly mounted in the star wheel, a connector rod having one end connected to the lead screw, and a pivot joint connected to the cutter assembly and to the other end of the connector rod for moving the cutting tool along the arcuate path as the lead screw moves through the star wheel, and the rotary drive includes; a gear drivingly connected to the drive shaft, a pinion meshing with the gear, a housing enclosing the gear and supporting the pinion, a stop connected to the housing to prevent rotation of the housing, and a fluid motor connected to the pinion for rotating the pinion.

9. A portable spherical bearing seat cutter machine for cutting a spherical bearing seat as defined in claim 1, wherein the cutter assembly includes; a cutter bearing mounted on the drive shaft, and said means includes; an arcuate track mounted on the cutter bearing having a curvature geometrically similar to the curvature of the bearing seat to be cut, and a way follower movably mounted on the arcuate track supporting the cutting tool, and the arcuate drive includes; a drive collar mounted on the drive shaft, a star wheel rotatably mounted on the drive collar, a drive rod mounted on one of the supports and intermittently engageable with the star wheel for rotating the star wheel an increment with each revolution of the drive shaft, a lead screw threadedly connected to the star wheel, a connector rod having one end connected to the lead screw, and a pivot joint connected to the way follower and to the other end of the connector rod for moving the way follower along the arcuate track as the lead screw moves relative to the star wheel.

10. A portable spherical bearing seat cutter machine for cutting a spherical bearing seat as defined in claim 1, wherein the cutter assembly includes; a cutter bearing mounted on the drive shaft, and said means includes; an arcuate track mounted on the cutter bearing having a curvature geometrically similar to the curvature of the bearing seat to be cut, and a way follower movably mounted on the arcuate track supporting the cutting tool; and said rotary drive includes; a gear drivingly connected to the drive shaft, a pinion meshing with the gear, a housing enclosing the gear and supporting the pinion, a stop connected to the housing to prevent rotation of the housing, and a fluid motor connected to the pinion for rotating the pinion.

11. A portable spherical bearing seat cutter machine for cutting a spherical bearing seat as defined in claim 1, wherein the cutter assembly includes; a cutter bearing mounted on the drive shaft, a counterweight mounted on the cutter bearing, and said means includes; an arcuate track mounted on the cutter bearing having a curvature geometrically similar to the curvature of the bearing seat to be cut, and a way follower movably mounted on the arcuate track supporting the cutting tool opposite the counterweight; and said arcuate drive includes; a drive collar mounted on the drive shaft, a star wheel rotatably mounted on the drive collar, a drive rod mounted on one of the supports and intermittently engageable with the star wheel for rotating the star wheel an increment with each revolution of the drive shaft, a lead screw threadedly connected to the star wheel, a universal joint connected to one end of the lead screw, a connector rod having one end connected to the universal joint, and a pivot joint connected to the way follower and to the other end of the connector rod for moving the way follower along the arcuate track as the lead screw moves relative to the star wheel.

12. A portable spherical bearing seat cutter machine for cutting a spherical bearing seat as defined in claim 1, wherein said drive shaft contains a lead screw groove; the cutter assembly includes; a cutter bearing mounted on the drive shaft, and said means includes; an arcuate track mounted on the cutter bearing having a curvature geometrically similar to the curvature of the bearing seat to be cut, and a way follower movably mounted on the arcuate track supporting the cutting tool; said rotary drive includes; a gear drivingly connected to the drive shaft, a pinion meshing with the gear, a housing enclosing the gear and supporting the pinion, a stop connected to the housing to prevent rotation of the housing, and a fluid motor connected to the pinion for rotating the pinion; and including; a lead screw rotatably mounted in the lead screw groove in the drive shaft, an axial drive nut threadedly mounted on the lead screw and connected to the cutter bearing, a star wheel drivingly connected to the lead screw for rotating the lead screw, and an axial drive rod mounted on one of the supports and intermittently engageable with the star wheel for rotating the star wheel with each revolution of the drive shaft.

13. A portable spherical bearing seat cutter machine for cutting a spherical bearing seat as defined in claim 1, wherein the cutter assembly includes; a cutter bearing mounted on the drive shaft, and said means includes; an arcuate track mounted on the cutter bearing having a curvature geometrically similar to the curvature of the bearing seat to be cut, and a way follower movably mounted on the arcuate track supporting the cutting tool; and including an axial drive connected to the cutter bearing for moving the cutter assembly axially along the drive shaft while the drive shaft is rotating.

14. A portable spherical bearing seat cutter machine for cutting a spherical bearing seat as defined in claim 1, wherein the cutter assembly includes; a cutter bearing mounted on the drive shaft, and said means includes; an arcuate track mounted on the cutter bearing having a curvature geometrically similar to the curvature of the bearing seat to be cut, and a way follower movably mounted on the arcuate track supporting the cutting tool; said rotary drive includes; a gear drivingly connected to the drive shaft, a pinion meshing with the gear, a housing enclosing the gear and supporting the pinion, a stop connected to the housing to prevent rotation of the housing, and a fluid motor connected to the pinion for rotating the pinion; and said arcuate drive includes; a drive collar mounted on the drive shaft, a star wheel rotatably mounted on the drive collar, a drive rod mounted on one of the supports and intermittently engageable with the star wheel for rotating the star wheel a given increment with each revolution of the drive shaft, a lead screw threadedly mounted in the star wheel, a universal joint connected to one end of the lead screw, a connector rod having one end connected to the universal joint, and a pivot joint connected to the way follower and to the other end of the connector rod for moving the way follower along the arcuate track as the lead screw moves through the star wheel.

15. A portable spherical bearing seat cutter machine for cutting a spherical bearing seat as defined in claim 1, wherein the drive shaft contains a lead screw groove, said rotary drive includes; a gear drivingly connected to the drive shaft, a pinion meshing with the gear, a housing enclosing the gear and supporting the pinion, and a fluid motor connected to the pinion for rotating the pinion; said arcuate drive includes; a drive collar mounted on the drive shaft, a star wheel rotatably mounted on the drive collar, a drive rod mounted on one of the supports and engageable with the star wheel for rotating the star wheel a given increment with each revolution of the drive shaft, a lead screw threadedly connected to the star wheel, a connector rod having one end connected to the lead screw, and a pivot joint connected to the cutter assembly and to the other end of the connector rod for moving the cutting tool along the arcuate path as the lead screw moves relative to the star wheel; and said axial drive includes; a second lead screw rotatably mounted in the lead screw groove, an axial drive nut threadedly mounted on the second lead screw and connected to the cutter assembly, a second star wheel drivingly connected to the second lead screw for rotating the second lead screw, and an axial drive rod mounted on one of said supports and intermittently engageable with the second star wheel for rotating the second star wheel with each revolution of the drive shaft.

16. A portable spherical bearing seat cutter machine for cutting a spherical bearing seat as defined in claim 1, wherein the cutter assembly includes; a cutter bearing mounted on the drive shaft, a counterweight mounted on the cutter bearing, and said means includes; an arcuate track mounted on the cutter bearing having a curvature geometrically similar to the curvature of the bearing seat to be cut, and a way follower movably mounted on the arcuate track supporting the cutting tool opposite the counterweight; said rotary drive includes; a gear drivingly connected to the drive shaft, a pinion meshing with the gear, a housing enclosing the gear and supporting the pinion, a stop connected to the housing to prevent rotation of the housing, and a fluid motor connected to the pinion for rotating the pinion; and said arcuate drive includes; a drive collar mounted on the drive shaft, a star wheel rotatably mounted on the drive collar, a drive rod mounted on one of the supports and intermittently engageable with the star wheel for rotating the star wheel a given increment with each revolution of the drive shaft, a lead screw threadedly connected to the star wheel, a connector rod having one end connected to the lead screw, and a pivot joint connected to the way follower and to the other end of the connector rod for moving the way follower along the arcuate track as the lead screw moves relative to the star wheel.

17. A portable spherical bearing seat cutter machine for cutting a spherical bearing seat as defined in claim 1, wherein the cutter assembly includes; a cutter bearing mounted on the drive shaft, and said means includes; an arcuate track mounted on the cutter bearing having a curvature geometrically similar to the curvature of the bearing seat to be cut, and a way follower movably mounted on the arcuate track supporting the cutting tool; said rotary drive includes; a gear drivingly connected to the drive shaft, a pinion meshing with the gear, a housing enclosing the gear and supporting the pinion, a stop connected to the housing to prevent rotation of the housing, and a fluid motor connected to the pinion for rotating the pinion; said arcuate drive includes; a drive collar mounted on the drive shaft, a star wheel rotatably mounted on the drive collar, a drive rod mounted on one of the supports and intermittently engageable with the star wheel for rotating the star wheel an increment with each revolution of the drive shaft, a lead screw threadedly mounted in the star wheel, a universal joint connected to one end of the lead screw, a connector rod having one end connected to the universal joint, and a pivot joint connected to the way follower and to the other end of the connector rod for moving the way follower along the arcuate track as the lead screw moves through the star wheel; and including an axial drive connected to the cutter bearing for moving the cutter assembly axially along the drive shaft while the drive shaft is rotating.

18. A portable spherical bearing seat cutter machine for cutting a spherical bearing seat comprising; a pair of spaced supports adapted for being connected to a workpiece having a spherical bearing seat for supporting the cutter machine on the workpiece, a drive shaft rotatably mounted in the spaced supports, said drive shaft having a chromium-plated outer surface, a lead screw groove formed in the drive shaft extending parallel to the axis of the drive shaft, a gear drivingly connected to the drive shaft, a pinion meshing with the gear, a housing enclosing the gear and supporting the pinion, a stop connected to the housing to prevent rotation of the housing, a fluid motor connected to the pinion for rotating the pinion, a cutter bearing slideably mounted on the drive shaft, an arcuate track mounted on the cutter bearing having a curvature geometrically similar to the curvature of the spherical bearing seat to be cut, a way follower slideably mounted on the arcuate track, a cutting tool connected to the way follower for cutting the spherical bearing seat in the workpiece, a counterweight mounted on the cutter bearing opposite the cutting tool, a drive collar mounted on the drive shaft, a star wheel rotatably mounted on the drive collar, a drive rod mounted on one of the supports and intermittently engageable with the star wheel for rotating the star wheel a given increment with each revolution of the drive shaft, a lead screw threadedly mounted in the star wheel, a universal joint connected to one end of the lead screw, a connector rod having one end connected to the universal joint, a pivot joint connected to the way follower and to the other end of the connector rod for moving the way follower along the arcuate track as the lead screw moves through the star wheel, a second lead screw rotatably mounted in the lead screw groove of the drive shaft, an axial drive nut threadedly mounted on the second lead screw and connected to the cutter bearing preventing the cutter bearing from rotating on the drive shaft, a second star wheel drivingly connected to the second lead screw for rotating the second lead screw, and an axial drive rod mounted on one of the supports and being intermittently engageable with the second star wheel for rotating the second star wheel a given increment with each revolution of the drive shaft.

* * * * *